Figure 1:
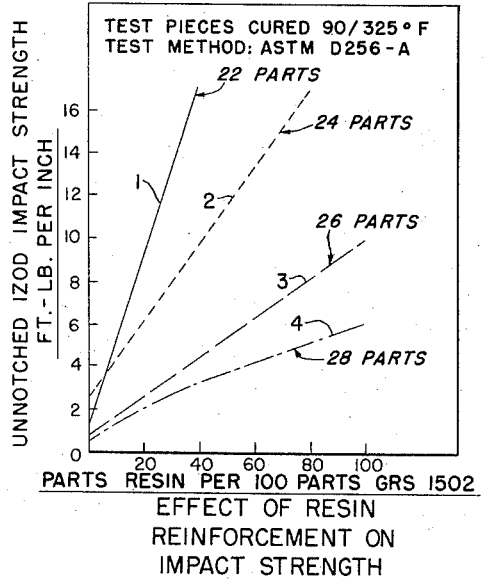

Oct. 8, 1957

H. S. SELL 2,809,175

HIGH SULPHUR RUBBER COMPOSITION CONTAINING A
RESINOUS STYRENE/DIENE COPOLYMER

Filed June 24, 1953

2 Sheets-Sheet 1

EFFECT OF RESIN REINFORCEMENT ON IMPACT STRENGTH

EFFECT OF RESIN REINFORCEMENT ON IMPACT STRENGTH

EFFECT OF RESIN REINFORCEMENT ON IMPACT STRENGTH

EFFECT OF RESIN REINFORCEMENT ON TENSILE STRENGTH

INVENTOR.
HAROLD S. SELL

BY
R. L. Miller
ATTORNEY

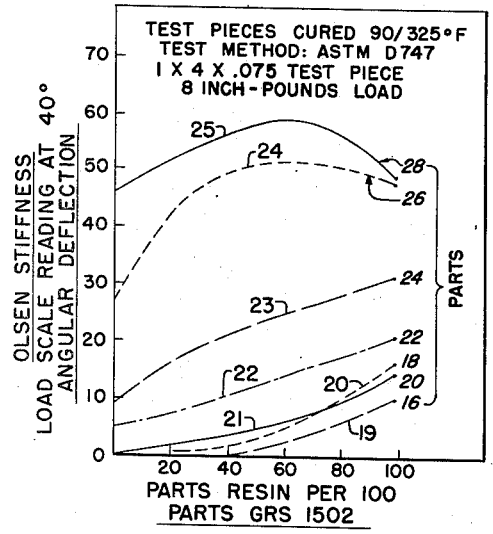
FIG. 5 — EFFECT OF RESIN REINFORCEMENT ON STIFFNESS
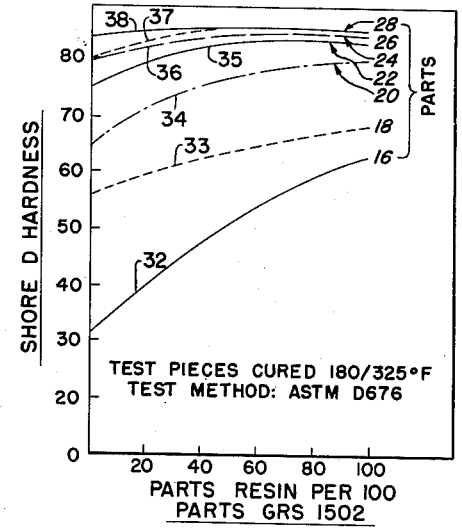
FIG. 7 — EFFECT OF RESIN REINFORCEMENT ON HARDNESS
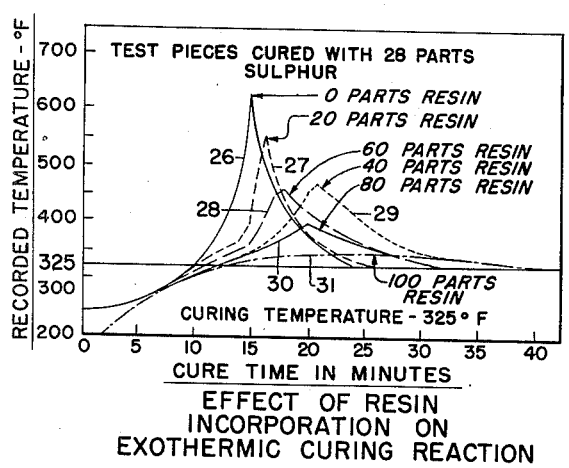
FIG. 6 — EFFECT OF RESIN INCORPORATION ON EXOTHERMIC CURING REACTION
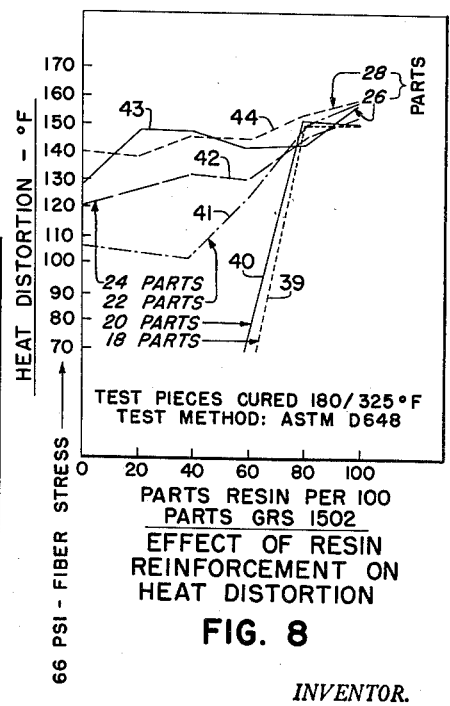
FIG. 8 — EFFECT OF RESIN REINFORCEMENT ON HEAT DISTORTION
INVENTOR.
HAROLD S. SELL
BY
R. L. Miller
ATTORNEY

United States Patent Office 2,809,175
Patented Oct. 8, 1957

2,809,175

HIGH SULPHUR RUBBER COMPOSITION CONTAINING A RESINOUS STYRENE/DIENE COPOLYMER

Harold S. Sell, Cuyahoga Falls, Ohio, assignor, by mesne assignments, to The Goodyear Tire & Rubber Company, a corporation of Ohio Application June 24, 1953, Serial No. 363,736

16 Claims. (Cl. 260—5)

This invention relates to a new composition of matter and particularly to a composition of matter having improved impact strength, tensile strength, and stiffness, which lends itself usefully as a substitute for hard rubber.

Soft rubber is vulcanized in the presence of not more than about 8 parts of sulfur and generally about 4 parts, and ebonite hard rubber is vulcanized in the presence of at least 32 parts of sulfur. Rubber vulcanized in the presence of more than 8 parts of sulfur and less than 28 parts of sulfur has little value either as soft rubber or as hard rubber because one or more properties of hardness, tensile strength, stiffness, and, more particularly, resistance to distortion under heat are not present to the degree required for commercial use, as may be seen in the following table:

TABLE

*Effect of a reduced sulfur in a hard rubber stock*

| | | | | | | | |
|---|---|---|---|---|---|---|---|
| GRS 1502 | 100.00 | 100.00 | 100.00 | 100.00 | 100.00 | 100.00 | 100.00 |
| Benzothiazyl Disulfide | 1.50 | 1.50 | 1.50 | 1.50 | 1.50 | 1.50 | 1.50 |
| Diphenyl Guanidine | .50 | .50 | .50 | .50 | .50 | .50 | .50 |
| Sulfur | 28.00 | 26.00 | 24.00 | 22.00 | 20.00 | 18.00 | 16.00 |
| | 130.00 | 128.00 | 126.00 | 124.00 | 122.00 | 120.00 | 118.00 |
| Actual Sp Gr. 90/325° F | 1.131 | 1.135 | 1.129 | 1.119 | 1.105 | 1.090 | 1.069 |
| Tensile: | | | | | | | |
| 60/325° F | 2,842 | 2,680 | 2,250 | 1,208 | 724 | 580 | 300 |
| 90 | 5,300 | 4,370 | 3,680 | 2,000 | 1,400 | 790 | 355 |
| 120 | 5,555 | 4,730 | 4,260 | 2,445 | 2,240 | 755 | 320 |
| 180 | 6,975 | 6,750 | 4,170 | 3,085 | 2,250 | 955 | 315 |
| 240 | 6,580 | 6,770 | 5,645 | 4,320 | 1,975 | 700 | 350 |
| Elongation, Percent: | | | | | | | |
| 60/325° F | 25 | 70 | 35 | 75 | 80 | 110 | 75 |
| 90 | 15 | 20 | 20 | 60 | 95 | 110 | 80 |
| 120 | 10 | 10 | 15 | 55 | 115 | 105 | 80 |
| 180 | 10 | 5 | 15 | 40 | 65 | 100 | 80 |
| 240 | 10 | 0 | 15 | 15 | 75 | 65 | 80 |
| Shore D: | | | | | | | |
| 60/325° F | 77 | 72 | 74 | 58 | 40 | 34 | 26 |
| 90 | 83 | 80 | 76 | 70 | 55 | 44 | 26 |
| 120 | 84 | 81 | 82 | 73 | 60 | 50 | 29 |
| 180 | 85 | 83 | 80 | 75 | 66 | 56 | 32 |
| 240 | 85 | 84 | 82 | 78 | 69 | 58 | 35 |
| Olsen Stiffness, 90/325° F. 1 x 4 x .075 8 in./# Load Scale Reading: | | | | | | | |
| 10 | 15.0 | 6.5 | 3.4 | 1.5 | | | |
| 20 | 28.0 | 13.5 | 5.3 | 2.6 | | | |
| 30 | 40.0 | 20.5 | 7.7 | 4.2 | | | |
| 40 | 50.0 | 27.0 | 9.1 | 4.7 | | | |
| 50 | 58.0 | 32.4 | 10.1 | 5.2 | too soft | too soft | too soft |
| 60 | 61.0 | 36.2 | 11.0 | 5.8 | | | |
| 70 | 60.0 | 38.9 | 11.5 | 5.8 | | | |
| 80 | 58.0 | 41.6 | 11.5 | 5.8 | | | |
| 90 | 58.0 | 43.2 | 11.5 | 5.3 | | | |
| Olsen Stiffness, 180/325° F. 1 x 4 x .075 8 in./# Load Scale Reading: | | | | | | | |
| 10 | 17.0 | 16.4 | 14.1 | 8.2 | 13 | | |
| 20 | 34.0 | 35.5 | 26.0 | 14.1 | 2.0 | | |
| 30 | 50.0 | 54.7 | 37.0 | 19.3 | 2.5 | | |
| 40 | 64.0 | 71.0 | 45.8 | 23.7 | 3.0 | | |
| 50 | 76.0 | 85.2 | 52.0 | 26.3 | 3.0 | too soft | too soft |
| 60 | 84.0 | 96.5 | 55.7 | 28.6 | 3.0 | | |
| 70 | 87.0 | | 53.0 | 27.1 | 3.0 | | |
| 80 | 87.0 | | 48.9 | 25.4 | 3.0 | | |
| 90 | 97.0 | | | | 3.0 | | |

PHYSICAL DATA ON 5 x 8 x ½" BLOCKS

| | | | | | | | |
|---|---|---|---|---|---|---|---|
| Shore D: | | | | | | | |
| 90/325° F | 87 | 83 | 85 | 81 | 61 | 47 | 27 |
| 180 | 87 | 85 | 86 | 82 | 73 | 52 | 33 |
| Unnotched Impact: | | | | | | | |
| 90/325° F | .75 | 1.00 | 2.50 | 1.17 | DNB | DNB | too soft |
| 180 | .25 | .75 | .54 | | 10.3 | DNB | |
| Notched Impact: | | | | | | | |
| 90/325° F | .04 | .21 | .29 | .58 | .33 | 16.5 | too soft |
| 180 | .13 | .40 | .25 | | .33 | 8.0 | |
| Heat Distortion: | | | | | | | |
| 90/325° F | 136° F. | 112° F. | 112° F. | too soft | too soft | too soft | too soft |
| 180 | 140° F. | 128° F. | 121° F. | 103° F. | | | |

DNB = Did not break—in excess of 16.7 ft.#/inch.

ASTM:
  Test Procedures used—
    Tensile strength _____ D530 using D412 (Die B) strip.
    Shore D hardness _____ D676.
    Olsen stiffness _____ D747.
    Izod impact strength _____ D256 Method A.
    Heat distortion point _____ D648.

It has now been discovered that a hard rubber can be made having improved hardness, improved impact strength, improved tensile strength, improved stiffness, as well as satisfactory resistance to distortion under heat only when the rubber is vulcanized not only in the presence of from 16 to 28 parts of sulfur but also in the presence of a resinous reaction product resulting from the polymerization of styrene and a conjugated diene hydrocarbon such as butadiene.

The improved results in physical properties of rubber vulcanized in the presence of from 16 to 28 parts of sulfur are obtained with natural rubber or a synthetic rubber, including GR–S, Buna N, polybutadiene and the synthetic rubbers made in accordance with the cold polymerization technique using 41° F. and activators such as cumene hydroperoxide.

In order to more graphically disclose the improved results obtained by the present invention, charts are set forth in the drawings and identified as Figs. 1 through 8.

The results set forth in the charts are those obtained by testing samples made in accordance with the following general formulation:

| | Parts |
|---|---|
| GR–S 1502 (Cold rubber made as indicated above) | 100 |
| High styrene resin | As shown |
| Primary accelerator (benzothiazyl disulfide) | 1.50 |
| Second accelerator (diphenyl guanidine) | 0.50 |
| Sulfur | As shown |

The rubber was broken down on a warm mill and compounded with the resin, accelerators, and sulfur in the conventional well-known methods used in the rubber industry. The compounded rubber was cured in sheet or block form under the conditions described below with reference to the various figures.

Fig. 1 shows the effect, on impact strength, of the addition of various amounts of resin to a GR–S type of rubber cured with various amounts of sulfur. When the rubber is cured with only 16 parts of sulfur the stock is too soft to test on an impact machine using an unnotched test piece. However, sufficient hardness is imparted to the stock when 60 parts of the resin has been added because with this much resin the stock develops an impact strength above 16 for an unnotched sample and a value of about 12 for a notched piece as shown by line 9 in Fig. 3. It is interesting to observe that when 18 to 20 parts of sulfur are used to cure the stock, impact strength above 16 is developed without the aid of the resin but the tensile strength, stiffness, hardness and, most important, the heat distortion properties are very poor as will be seen from a discussion of the remaining charts. When 22 parts of sulfur are used to cure the stock the impact strength falls off sharply to a value of less than 2 foot-pounds/inch as may be seen from curve 1. However, the impact strength rises sharply to a value exceeding 16 foot-pounds/inch when the resin is added in amounts up to 40 parts.

When 24 parts of sulfur are used in the vulcanization of the rubber, the impact strength is slightly over 2 foot-pounds/inch where no resin is present, whereas with the addition of the resin in amounts up to 80 parts of resin, the impact strength rises sharply to the limit of the machine, as shown by line 2 in Fig. 1. When sulfur is used in an amount greater than 24 parts, as for example, 26 parts and 28 parts, the impact strength of the resulting vulcanizing stock is also relatively low in the absence of resin but materially improved by the addition of resin in amounts up to 100 parts, as shown in Fig. 1 by lines 3 and 4, respectively.

Figure 2:
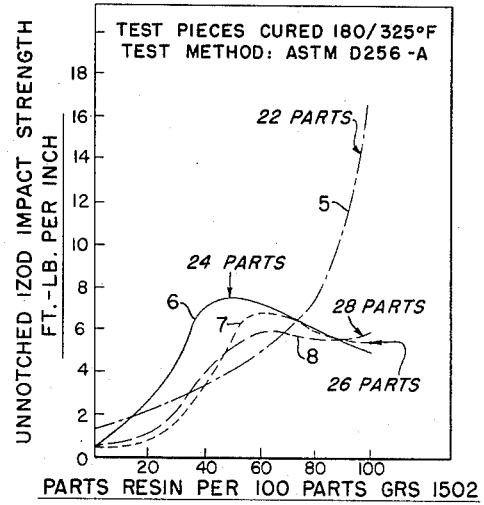

The chart of Fig. 1 shows the effects on impact strength when the rubber is cured for 90 minutes at 325° F. while Fig. 2 shows the results on impact strength when the rubber is cured for 180 minutes at the same temperature. The same general results are obtained with test pieces cured for 180 minutes at 325° F. with 16, 18 and 20 parts of sulfur as were obtained and described in connection with the chart of Fig. 1 where the test pieces were cured for 90 minutes at 325° F. Line 5 shows that rubber vulcanized in the presence of 22 parts of sulfur has an impact strength of less than 2 but is greatly improved in impact strength by the addition of resin up to 100 parts per 100 parts of rubber to a value exceeding 16. Lines 6, 7 and 8 also indicate that the rubber stock cured in the presence of 24, 26 and 28 parts of sulfur has impact value of less than 1 but is improved in impact by the addition of resin up to 100 parts.

Figure 3:
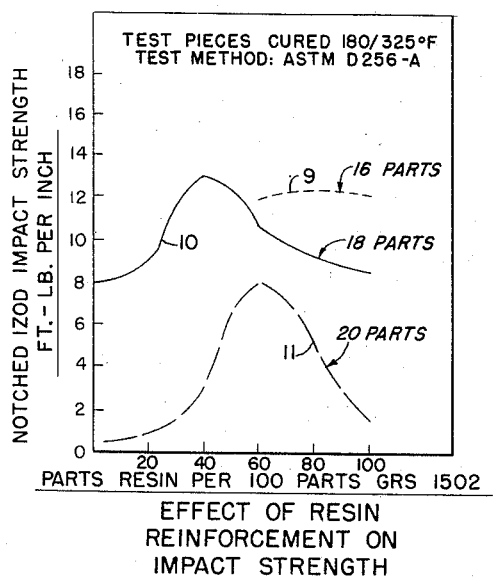

Fig. 3 shows how the impact strength is improved by the addition of the resin in amounts up to 100 parts to the rubber cured with 16, 18 and 20 parts of sulfur as measured on notched test pieces and as represented by lines 9, 10 and 11 respectively. Line 10 shows that a maximum improvement in impact strength occurs with the use of about 40 parts of the resin, while line 11 shows that a maximum improvement in impact strength occurs with the use of about 60 parts of the resin.

Figure 4:
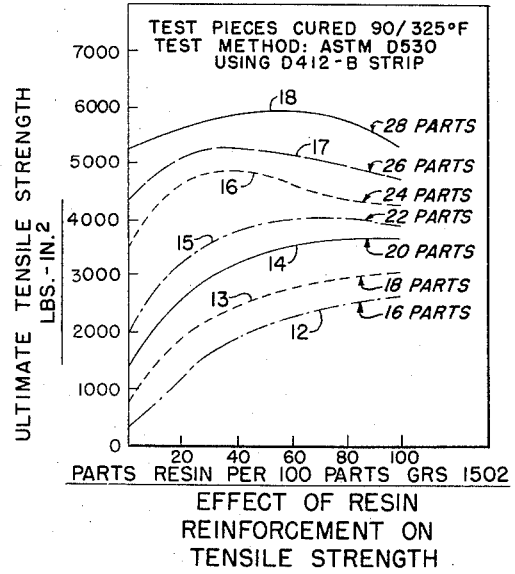

Fig. 4 shows the gradual improvement in tensile strength as represented by lines 12, 13 and 14 of rubber vulcanized in the presence of 16, 18 and 20 parts of sulfur, respectively, while using increasing amounts of the resin. Lines 15, 16, 17 and 18 represent how the rubber vulcanized in the presence of 22, 24, 26 and 28 parts of sulfur, respectively, passes through a maximum value for tensile strength as increasing amounts of resin are added.

Fig. 5 shows the improvement in stiffness as represented by lines 19, 20, 21, 22 and 23 which is imparted to the rubber vulcanized in the presence of 16, 18, 20, 22 and 24 parts of sulfur, respectively, when adding increasing amounts of resin up to 100 parts. Lines 24 and 25 represent how the rubber vulcanized in the presence of 26 and 28 parts of sulfur, respectively, passes through a maximum value in stiffness as the amount of resin added is increased.

Fig. 6 shows an important processing improvement brought about by the incorporation of the resin in amounts from 0 to 100 parts with regard to the heat generated within the stock during curing with 28 parts of sulfur at 325° F. as shown by lines 26 through 31. The same general lowering effect on exothermic reaction is also observed with regard to stocks cured with less than 28 parts of sulfur. This means faster curing. Also the possibility of curing thicker sections without burning.

Fig. 7 shows the improvement in hardness brought about by the addition of resin in amounts up to 100 parts in the rubber stocks vulcanized in the presence of from 16 to 28 parts of sulfur as represented by lines 32 through 38.

Fig. 8 shows the effect on heat distortion when the resin is added in amounts up to 100 parts for stock cured with 18 to 28 parts of sulfur. Test pieces cured with 16, 18 and 20 parts of sulfur without resin addition distort below room temperature and therefore have no value where heat distortion values must be above room temperature. Values for distortion above room temperature are achieved when about 60 parts of the resin are added, and the distortion value rises sharply to about 150° F. when 80 parts of resin are added, all as shown by lines 39 and 40. Distortion values are also improved on stock vulcanized with from 22 to 28 parts of sulfur by the addition of the resin as shown by lines 41, 42, 43 and 44.

Any resinous copolymer of styrene may be used in producing the improved composition of this invention, particularly the resinous copolymers resulting from the polymerization of styrene, and of particular value is a conjugated diene hydrocarbon in which the styrene is present in amount from 75 to 95 parts per 100 parts of monomer being reacted. Any diene hydrocarbon may be used, including butadiene-1,3, isoprene, and other suitable dienes. It is preferred to form the polymer in the aqueous phase using a peroxide catalyst such as potassium persulfate, and an initiator of reaction such as for example, a mercaptan, specifically dodecyl mercaptan. The resin may be made in accordance with methods well-known in the art and as more specifically shown in U. S. Patent 2,638,462.

An example of a specific resin that may be used is one resulting from the aqueous emulsion polymerization of a mixture comprising 90 parts of styrene and 10 parts of butadiene-1,3, and having the following properties:

Softening point—150° F.; specific gravity—1.05; and Olsen flow of 180 seconds per inch at 212° F., and 1500 pounds per sq. in. pressure.

The resin may be added to the rubber in amounts ranging from 5 to 100 parts per 100 parts of rubber, and more pronounced results in certain physical properties are obtained at different sulfur level rubbers when using different amounts of the resin. For example, as shown in Fig. 3, maximum notched impact strength is obtained in the 20 part sulfur level rubber when 60 parts of resin are added, whereas optimum notched impact strength is obtained in the 18 part sulfur level when adding 40 parts of resin. With regard to tensile strength, an ultimate value appears to be reached in the 28 part sulfur level rubber when adding about 80 parts of resin as shown by line 18 in Fig. 4.

It is well known in the manufacture of hard rubber that a difficult problem constantly faced by the manufacturer is the control of the exothermic reaction which occurs between the sulfur and the rubber during vulcanization. Because of this exothermic reaction, restrictions on the gauge of the article being cured, the temperature at which the article may be cured, and the time cycle, limit the range of conditions that the manufacturer may use in making the hard rubber. The addition of resin to the rubber lowers the exothermic temperature developed during the vulcanization considerably, as shown in Fig. 6, and the greatest effect is observed when 100 parts of resin are used.

Another important improvement observed in the manufacture of the hard rubber composition of this invention is in the improved surface appearance possessed by the vulcanized stock in which the resin was present. Under identical conditions of shaping and molding of the rubber containing, in both instances, the same amount of sulfur, but in one case containing no resin and in the other case containing anywhere from 20 to 100 parts of resin, the vulcanized rubber containing the resin always had the superior surface appearance. This was particularly so in regard to the stocks made with the use of higher sulfur ratios.

The values plotted in the charts are based upon unload stocks. It has been discovered that the rubber compositions containing the resin tolerate considerable loading with, for example, hard clay and the like, before the impact values of the loaded stock degenerate to an unusable level. Thus, the rubber stock of this invention may be loaded with a greater amount of filler material than a rubber stock not containing the resin, and thus permits the manufacture of the hard rubber composition at a lower cost while at the same time the loading material contributes to increasing the stiffness and the heat distortion point of the vulcanized stock. As much as 60 volumes of loading per 100 volumes of rubber or as much as 150 parts of loading per 100 parts of rubber may be added.

The present invention makes possible the production of hard rubber stocks in a given sulfur range having higher heat distortion values and higher impact strength than was possible heretofore, and also makes possible the utilization of a range of sulfur levels heretofore of only limited value in the manufacture of hard rubber. The present invention also provides a means for controlling the exothermic curing reaction heretofore so troublesome in the hard rubber field without sacrificing physical properties. Conversely, the present invention affords a means for curing thicker sections of hard rubber using faster cures without the danger of charring. The present invention also improves the milling properties of the rubber, the preforming operations of the milled stock, as well as producing an improved surface appearance on the finished cured stock.

The hard rubber compositions of this invention may be used for the same purposes used by conventional hard rubber stock, that is, in the manufacture of combs, automobile steering wheels, and many other molded products requiring high heat distortion, stiffness, impact resistance, and the tensile possessed by the composition of this invention.

While certain representative embodiments and details have been shown for the purpose of illustrating the invention, it will be apparent to those skilled in this art that various changes and modifications may be made therein without departing from the spirit or scope of the invention.

I claim:

1. A vulcanizable composition comprising a rubber selected from at least one of the group consisting of natural rubber, rubbery copolymer of butadiene and styrene, rubbery copolymer of butadiene and acrylonitrile, and polybutadiene, 16 to 28 parts of sulfur, and from about 5 parts to not more than 100 parts of a resinous copolymer of styrene and a diene hydrocarbon, the parts being per 100 parts of rubber.

2. A hard thermoset vulcanized composition comprising a rubber, selected from at least one of the group consisting of natural rubber, rubbery copolymer of butadiene and styrene, rubbery copolymer of butadiene and acrylonitrile, and polybutadiene, 16 to 28 parts of sulfur, and from about 5 parts to not more than 100 parts of a resinous copolymer of styrene and a diene hydrocarbon, the parts being per 100 parts of rubber.

3. A vulcanizable composition comprising natural rubber, 16 to 28 parts of sulfur, and from about 5 parts to not more than 100 parts of a resinous copolymer of styrene and a diene hydrocarbon, the parts being per 100 parts of rubber.

4. A hard thermoset vulcanized composition comprising natural rubber, 16 to 28 parts of sulfur, and from about 5 parts to not more than 100 parts of a resinous copolymer of styrene and a diene hydrocarbon, the parts being per 100 parts of rubber.

5. A vulcanizable composition comprising synthetic rubber, 16 to 28 parts of sulfur, and from about 5 parts to not more than 100 parts of a resinous copolymer of styrene and a diene hydrocarbon, the parts being per 100 parts of rubber.

6. A hard thermoset vulcanized composition comprising synthetic rubber, 16 to 28 parts of sulfur, and from about 5 parts to not more than 100 parts of a resinous copolymer of styrene and a diene hydrocarbon, the parts being per 100 parts of rubber.

7. A vulcanizable composition comprising a rubber selected from at least one of the group consisting of natural rubber, rubbery copolymer of butadiene and styrene, rubbery copolymer of butadiene and acrylonitrile, and polybutadiene, 16 to 28 parts of sulfur, and from about 5 parts to not more than 100 parts of a resinous copolymer of styrene and a diene hydrocarbon, and a filler, the parts being per 100 parts of rubber.

8. A vulcanizable composition comprising a rubber selected from at least one of the group consisting of natural rubber, rubbery copolymer of butadiene and styrene, rubbery copolymer of butadiene and acrylonitrile, and polybutadiene, 16 to 28 parts of sulfur, and from about 5 parts to not more than 100 parts of a resinous copolymer of styrene and butadiene, the parts being per 100 parts of rubber.

9. A hard thermoset vulcanized composition comprising a rubber selected from at least one of the group consisting of natural rubber, rubbery copolymer of butadiene and styrene, rubbery copolymer of butadiene and acrylonitrile, and polybutadiene, 16 to 28 parts of sulfur, and from about 5 parts to not more than 100 parts of a resinous copolymer of styrene and butadiene, the parts being per 100 parts of rubber.

10. A vulcanizable composition comprising a rubber selected from at least one of the group consisting of natural rubber, rubbery copolymer of butadiene and styrene, rubbery copolymer of butadiene and acrylonitrile, and polybutadiene, 16 to 28 parts of sulfur, and from about 5 parts to not more than 100 parts of a resinous copolymer of 90 parts of styrene and 10 parts of butadiene, the parts being per 100 parts of rubber.

11. A thermoset vulcanized composition comprising a rubber selected from at least one of the group consisting of natural rubbery, rubbery copolymer of butadiene and styrene, rubbery copolymer of butadiene and acrylonitrile, and polybutadiene, 16 to 28 parts of sulfur, and from about 5 parts to not more than 100 parts of a resinous copolymer of 90 parts of styrene and 10 parts of butadiene, the parts being per 100 parts of rubber.

12. A vulcanizable composition comprising a rubbery copolymer of styrene and butadiene, 16 to 28 parts of sulfur, and from about 5 parts to not more than 100 parts of a resinous copolymer of styrene and a diene hydrocarbon, the parts being per 100 parts of rubbery copolymer.

13. A hard thermoset vulcanized composition comprising a rubbery copolymer of styrene and butadiene, 16 to 28 parts of sulfur, and from about 5 parts to not more than 100 parts of a resinous copolymer of styrene and a diene hydrocarbon, the parts being per 100 parts of rubbery copolymer.

14. A vulcanizable composition comprising a rubbery copolymer of styrene and butadiene, 16 to 28 parts of sulfur, and from about 5 parts to not more than 100 parts of a resinous copolymer of 90 parts of styrene and 10 parts of butadiene, the parts being per 100 parts of rubbery copolymer.

15. A hard thermoset vulcanized composition comprising a rubbery copolymer of styrene and butadiene, 16 to 28 parts of sulfur, and from about 5 parts to not more than 100 parts of a resinous copolymer of 90 parts of styrene and 10 parts of butadiene, the parts being per 100 parts of rubbery copolymer.

16. A vulcanizable composition comprising a rubbery copolymer of styrene and butadiene, made by polymerizing the styrene and butadiene at about 41° F., 16 to 28 parts of sulfur, and from about 5 parts to not more than 100 parts of a resinous copolymer of styrene and a diene hydrocarbon, the parts being per 100 parts of rubbery copolymer.

References Cited in the file of this patent

UNITED STATES PATENTS

| | | |
|---|---|---|
| 2,414,803 | D'Alelio | Jan. 28, 1947 |
| 2,541,748 | Daly | Feb. 13, 1951 |
| 2,614,093 | Wheelock | Oct. 14, 1952 |
| 2,638,457 | Gates | May 12, 1953 |
| 2,661,339 | Sparks | Dec. 1, 1953 |

OTHER REFERENCES

Barron: "Modern Synthetic Rubber," 3rd edition, 1949, Chapman-Hall, London, pages 249–250.